HIGH FREQUENCY RECORDING USING ENHANCED SENSITIVITY THERMOPLASTIC MEDIA

Filed Dec. 30, 1964

Inventors:
Joseph Gaynor,
Laddie L. Stahl,
by Charles W. Helzer
Their Attorney.

Dec. 26, 1967 J. GAYNOR ET AL 3,360,784

HIGH FREQUENCY RECORDING USING ENHANCED SENSITIVITY THERMOPLASTIC MEDIA

Filed Dec. 30, 1964 2 Sheets-Sheet 2

Inventors:
Joseph Gaynor,
Laddie L. Stahl,
by Charles W. Helzer
Their Attorney.

United States Patent Office 3,360,784

Patented Dec. 26, 1967

3,360,784

HIGH FREQUENCY RECORDING USING ENHANCED SENSITIVITY THERMOPLASTIC MEDIA

Joseph Gaynor, Schenectady, and Laddie L. Stahl, Rexford, N.Y., assignors to General Electric Company, a corporation of New York Filed Dec. 30, 1964, Ser. No. 422,181
14 Claims. (Cl. 340—173)

ABSTRACT OF THE DISCLOSURE

Frequency response of electron beam recording on a thermoplastic medium is greatly improved by negatively charging the medium to a voltage just below the threshold potential at which deformation occurs and writing on the surface of the medium by adding negative voltage thereto with an electron beam, or by positively charging the medium to a voltage just above the threshold potential at which deformation occurs and writing on the surface of the medium by selectively discharging the positive voltage with an electron beam. The smaller beam currents thus required for writing allow a marked increase in frequency response.

The present invention relates to data storage systems employing charge, sensitive, deformable, solid thermoplastic film recording media.

More particularly, the invention relates to a new and improved data storage method and apparatus wherein the current requirements of the electron beam used for recording in the process is substantially reduced resulting in much higher frequency recording.

In recent years, the General Electric Company, assignee of the present invention, has introduced into the information storage and retrieval art a new method of information recording and retrieval known as thermoplastic recording. In this method of recording, a charge sensitive, deformable, solid thermoplastic medium is used upon which electrostatic charges are deposited, usually with an electron gun, with the charges being arrayed in a manner which is representative of the information to be recorded. Subsequent heating of the thermoplastic material to a sufficiently fluid state permits the electrostatic forces to deform the surface in accordance with the array of deposited charges. Rapid cooling freezes the deformations in place. The information thus recorded may then be retrieved using light optic or electron optic techniques after an indefinite storage period. For a more detailed description of an analog recording system using this method of solid thermoplastic recording, reference is made to U.S. Patent No. 3,113,179, entitled "Method and Apparatus for Recording," issued Dec. 3, 1963, W. E. Glenn, inventor; and for a description of a digital data recording system using thermoplastic film recording, see U.S. Patent No. 3,121,216, entitled "Quick Access Reference Data File," issued Feb. 11, 1964, J. E. Wolfe, W. C. Hughes, R. J. Rieke, and H. L. Lester, inventors; both of these patents being assigned to the General Electric Company. In thermoplastic recording, sufficient surface charge must be deposited at a desired site to ensure deformation upon subsequent heating of the recording medium. The charge deposited is a function of the beam current and sweep rate. Although sweep rates can be very high, beam current is limited by the materials which constitute the cathode and anode. As a result, frequency at which data can be recorded has been limited. The present invention has been devised to overcome this limitation.

It is therefore a primary object of the present invention to provide a new and improved method and apparatus for data storage employing a new technique for reducing the beam current requirements of the electron beam recording device used in the apparatus thereby making it possible to increase the speed (frequency) at which data can be recorded.

In practicing the invention, a method of storing data is provided which uses a solid thermoplastic recording medium and comprises precharging or post charging the surface of the recording medium to a predetermined level measured with respect to the voltage gradient required for deformation. Recording is accomplished in part by projecting a beam of electrons or ions onto the recording medium subsequent to the precharging or prior to a subsequent post charging operation to thereby form modulated electrostatic charge patterns on the surface of the recording medium which are representative of the data to be stored. The recording medium is then heated to a sufficiently fluid condition so that the electrostatic charge forces deform its surface. Cooling of the recording medium subsequently freezes these deformations which then represent the data to be stored.

In carrying out the above method of recording, apparatus is provided which comprises recording means for projecting a beam of charges onto a solid thermoplastic film recording medium in intelligence conveying patterns and heating means for heating the recording medium to a sufficiently fluid condition. This basic apparatus is modified by the improvement which comprises either a precharging or a postcharging means for charging the surface of the solid thermoplastic recording medium to a predetermined level relative to a known threshold voltage for deformation whereby the recording means need only supply the additional charging required to alter the voltage relative to the known threshold voltage for deformation sufficiently so that upon subsequent heating, selective deformations of the surface of the recording medium by the electrostatic charge pattern in accordance with the data to be stored occurs.

Other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein.

Figure 1:
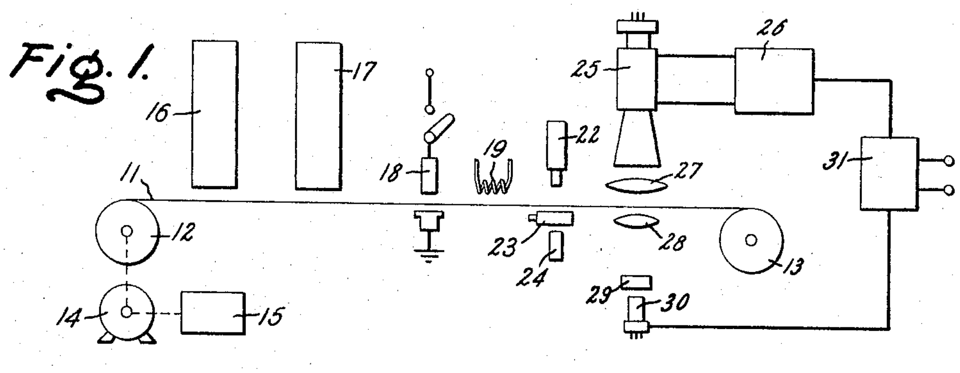
FIGURE 1 is a schematic diagram of an over-all recording and readout apparatus for carrying out the novel recording method in accordance with the invention.

In recording information on a solid thermoplastic medium in the manner described for example in the above-identified Wolfe Patent No. 3,121,216, it is quite often desirable to record information at the highest possible rate (that is to record the information at the highest possible frequency) in order to record a maximum amount of information in a minimum amount of space and time. One of the factors which limits the speed (and hence frequency) at which data may be recorded on a solid thermoplastic medium is the requirement that at least a certain minimum threshold potential difference (or voltage gradient) be attained at any particular point on the thermoplastic medium in order to result in deformation upon subsequent heating of the medium as described in either of the above-identified referenced patents. It has been demonstrated both theoretically and experimentally that there is a minimum threshold potential gradient for a given thickness of solid thermoplastic medium which is necessary (as in the case of depositing electron charges with an electron beam writer as described in the above two referenced patents) before deformation will occur upon subsequent heating of the medium. This minimum value of potential is known as the threshold potential, and has been described by Glenn in terms of the current density required from an electron beam in an article appearing in the Journal of Applied Physics—vol. 30, No. 12—December 1959—pages 1870–1873; entitled, "Thermoplastic Recording." It has been described also with respect to the conditions required for the formation of frost on a solid thermoplastic recording medium in an article appearing in the Journal of Applied Physics, volume 34, No. 8, August 1963, on pages 2327 thru 2330, entitled, "New Type of Thermoplastic Deformation," by P. J. Cressman.

The threshold potential constitutes the minimum potential difference which will assure the creation of deformations in a solid thermoplastic recording medium upon heating. The assumption made in computing this value is that the potential on the surface of the thermoplastic is zero. Therefore, all the charges required to build up the necessary voltage gradient must be supplied by the writing electron beam. If, however, there is already a voltage on the surface, then it need only be modified sufficiently to produce deformation. This concept is especially significant because the deformation force is proportional to the square of the voltage gradient.

The benefits inherent in the employment of a superimposed background voltage are best illustrated numerically. The field necessary to just produce deformation in a thermoplastic medium is approximately $2\times10^5$ volts/cm. This value has been shown by Cressman and agrees with independent computations published by J. Gaynor and S. Aftergut in the Journal of Applied Physics, 34, 2102 (1963). The deformation force is proportional to the square of the field in accordance with the Helmholtz equation, i.e.

$$\Delta P=W(E^2) \qquad (1)$$

where:

$\Delta P$=the pressure above atmosphere;
$K$=a proportionally constant which is a function of the material characteristics; and
$E$=electric field (volts/cm.).

If the voltage gradient is derived from two sources, then Equation 1 becomes:

$$\Delta P=K(E_1^2+E_2^2) \qquad (2)$$

for the additional cases; and $$\Delta P=K(E_1^2-E_2^2) \qquad (3)$$

in those circumstances where a voltage of opposite sign is imposed.

Let us assume then that a voltage gradient is imposed on the medium 0.01 volt below that required for deformation. Then the additional voltage required if deformation is to occur can be computed as follows: Let $E_D$=deformation potential, then ($E_D$—0.01) will equal the applied presensitizing background potential, and $E_b$ will be the voltage to be supplied by the writing electron beam in order to selectively deform the surface. Then from Equation 1:

$$\Delta P=K(E_D)^2 \qquad (4)$$

$$\Delta P=K(E_D-0.01)^2+E_b^2 \qquad (5)$$

$$(E_D)^2=(E_D-0.01)^2+E_b^2 \qquad (6)$$

$$(E_D)^2=E_D^2-0.02E_D+10^{-4}+E_b^2 \qquad (7)$$

Since $10^{-4}$ is much smaller than $0.02E_D$, it may be treated as equal to zero, and $$E_b^2=0.02E_D \qquad (8)$$

or $$E_b=0.14(E_D)^{1/2} \qquad (9)$$

Sine $E_D$ was $2\times10^5$ volts/cm., therefore $$E_b=63 \text{ volts/cm.}$$

If a five micron film is assumed, then the surface potential for deformation is 100 volts. If the surface of the film is precharged with a background voltage of 99.99 volts, then the additional voltage required for deformation is 0.032 volt. The ratio of the frequencies possible, if a constant beam current is used with and without this background voltage, is 100/0.032, or approximately 3,000 to 1. It is readily apparent that the treatment is virtually identical except for insignificant algebraic differences if a background voltage in excess of that just required for deformation is employed, and it is then selectively neutralized. If, as is more likely, a one volt differential on either side of the deformation potential is used, then the voltage to be supplied by the electron beam for a five micron film is 0.32 volt, and the frequency ratio with the addition of a background potential to that without one is 300 to 1.

The foregoing discussion has pertained to voltage variations around the threshold potential for deformation. It should be appreciated, however, that the deformation force increases with the square of the voltage gradient. Thus, for relatively small increases in the absolute value of the surface potential, there will be substantial increases in the depth of the grooves, and as a consequence in their slope and the amount of light which they refract. It can be appreciated therefor that the initial background potential need not be at or near the threshold. Indeed, assuming the dielectric strength as an upper limit, the higher it is with respect to the threshold value for deformation, the greater the differential deformation force for the same incremental increase in surface potential provided by the writing beam. This can also be illustrated by numerical examples.

Assume a precharged background potential gradient equal to 1.0, 1.5 and 2.0 times the threshold value for deformation, i.e., 100 volts for a 5 micron thick thermoplastic film, and a differential voltage of one volt for all three initial potentials. The computed values of the differential forces are in accordance with the values of the initial potentials, i.e., the differential deformation force is twice as large when the background potential is twice the threshold deformation potential. Therefore, higher background potentials enhance the sensitivity even further. The fact that the background potential is greater than the threshold value has no effect because net deformation is critical. The areas with the higher deformation forces will move with respect to those on which smaller forces are exerted as shown mathematically in Equation 3. As before, it is the differential force which produces the requisite deformations even though the background voltage is no longer smaller than that which will of itself produce deformations. It is proposed, therefore, to charge the surface of an electron sensitive, deformable thermoplastic recording medium with a differential voltage to provide improved sensitivity and frequency response in accordance with the principles discussed above. As a consequence, the electron beam recorder then need only supply the additional charging required to alter the charge level sufficiently so that upon subsequent heating, selective deformation of the surface of the thermoplastic film recording medium by the electrostatic charge forces in accordance with the data to be stored occurs. In one practical embodiment of the invention it is proposed to negatively precharge the surface of the thermoplastic film recording medium with electrons to a value just below the threshold value. Then, in the areas where it is desired that deformations be recorded, the electron beam writer need only supply the electrons required to push the potential or charge level at these points beyond the deformation threshold value to as high a level as desired. This then substantially reduces the number of electrons as previously shown which the electron beam writer must deposit per unit of time, and hence permits higher frequency recording at lower beam currents while still obtaining high quality recordings. It is also proposed to charge the surface of the thermoplastic recording medium with a positive charge having a value just above the threshold level for deformation. The electron beam writer then need only supply sufficient negative charge to selectively neutralize the positive charge at points where it is desired that no deformations occur. Insofar as the electron beam writer is concerned, the effect is identical in that the beam current required for a particular exposure is considerably reduced, and higher frequency recording can be achieved. The difference lies in the fact that the resulting recording is a negative of that which would be obtained if the negative precharging were used. Insofar as the data recorded is concerned, however, this characteristic is of no importance. This is particularly true if a line scan readout scheme is used to retrieve the information, since the resulting recording would constitute a series of deformations and no deformations in accordance with the data desired to be stored as discussed more fully in the above-referenced Wolfe, et al. Patent No. 3,121,216, for example. In addition to the above discussed techniques which employ a precharge to the solid thermoplastic recording medium, it is also possible to utilize a post charge having either a positive or negative polarity and achieve similar results. Namely, a substantial reduction in the beam current requirements of the electron beam writer with a consequent increase in the speed at which recording can be achieved.

A schematic block diagram of a recording-readout equipment suitable for carrying out the present invention is illustrated in FIGURE 1 of the drawings. The equipment shown in FIGURE 1 of the drawings includes a solid thermoplastic recording tape 11 supported on a pair of reels 12 and 13 for taking up and feeding out the tape 11. For this purpose, the reel 12 may be driven by a motor 14 which in turn is controlled by a tape transport control means 15. For a detailed description of the fabrication of a suitable solid thermoplastic recording tape 11, reference is made to the above-referenced Glenn Patent No. 3,113,179, and for a detailed description of a suitable tape transport mechanism for use in the equipment illustrated in FIGURE 1 of the drawings, reference is made to U.S. application Ser. No. 835,210 entitled, "Thermoplastic Film Tape Recorder," filed Aug. 21, 1959, and now abandoned, W. C. Hughes, J. E. Wolfe, and R. J. Rieke, inventors.

The thermoplastic film recording tape 11 is disposed on the supporting reels 12 and 13 in a position adjacent to and passing under an electron flood gun 16 and an electron recording gun 17, the construction of which will be described more fully hereinafter. If it is assumed that the tape 11 is being driven in a direction to be taken up on the reel 13, the tape after passing out from under the electron recording gun 17 will pass under a heating means comprised by a radio frequency heater 18, and then passes under a cooling means indicated by the cooling coil 19. After passing under the cooling means 19, the tape 11 will have permanent deformations formed in its surface which may then be checked or observed for inspection purposes by a suitable optical inspection assembly comprised by a light source 22, a fluorescent plate 23 and an optical microscope 24 of conventional construction. The optical inspection assembly is optional and may be deleted from the equipment, however, for most purposes it is preferred to provide such optical inspection of the tape in order to assure that the recording operation is functioning properly prior to recording long passages of information.

After passing through the inspection station, the thermoplastic film tape 11 then passes under the read-out station which is comprised by a flying spot scanner 25 controlled by control circuitry 26. The flying spot scanner 25 produces a scanning beam of light that is imaged by an optical assembly 27 upon the solid thermoplastic recording tape 11. Light emanating from the thermoplastic tape 11 is then imaged by a lens 28 upon an apertured plate 29 which normally prevents light from falling on a photo tube read-out device 31 in the absence of deformations. In the presence of a deformation on the surface of the tape 11, however, light will be passed by the apertured plate 29 and fall upon the photo tube 30 to produce an electrical output signal that is representative of the data recorded on the surface of the thermoplastic film recording tape 11. This electrical output signal is processed by an output and feedback amplifier 31 and supplied back to control circuitry 26 for servoing purposes, as well as being supplied to a suitable output indicator (not shown). For a more detailed description of the construction and manner of operation of the readout assembly comprised in part by flying spot scanner 25, reference is made to the above-identified Wolfe, et al. Patent No. 3,121,216. It should be noted that while the equipment shown in FIGURE 1 is designed for both recording and readout, it is entirely possible to design the equipment in a manner to eliminate the readout station so that recording alone takes place on the tape, and provide a second separate equipment to accomplish readout. However, it is believed that for most applications, a combined record-readout apparatus would be desirable.

Figure 2:
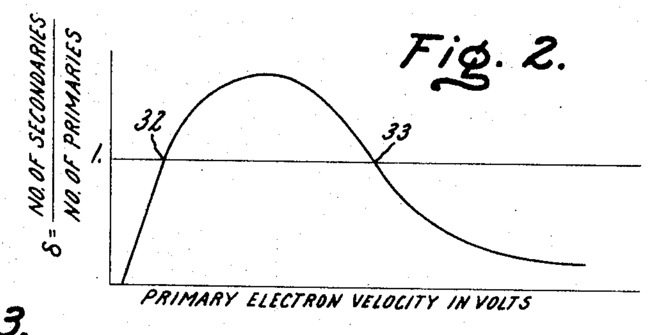
FIGURE 2 is a plot of the secondary electron emission characteristics of a typical solid thermoplastic recording medium.

In operation, the tape transport mechanism comprised by the two supporting reels 12 and 13, the drive motor 14 and its controlled circuitry 15, causes any given portion of the thermoplastic recording tape 11 to be moved sequentially past the electron flood gun 16, electron beam recorder 17, the heating station 18, the cooling station 19, the optical inspection station 22–24, and finally to the readout station 25–31 before being taken up on the take up reel 13. At the time that the portion of the surface of the thermoplastic tape 11 is passing under the electron flood gun 16, its surface will be precharged to a predetermined charge level measured with respect to a known threshold potential as discussed above. If it is desired to precharge the surface of the thermoplastic tape 11 with a negative polarity charge, then it is precharged to a charge value just below the known threshold potential. This can be accomplished by adjusting the voltage of the flood gun 16 so that the primary electron velocity as shown in FIGURE 2 of the drawings is at a value below the first cross-over point 32 or above the second cross-over point 33. Any given thermoplastic recording medium will exhibit the characteristic shown in FIGURE 2 wherein the ratio of the number of secondary electrons emitted from its surface with respect to the number of primary electrons impinging on its surface, is plotted against the primary electron velocity measured in volts. The two points where this characteristic curve crosses a ratio value equal to one (where the number of secondaries is equal to the number of primaries), are known as the first and second cross-over points. It can be appreciated therefore that if the surface of the thermoplastic film tape 11 is bombarded with electrons having an energy measured in volts below the first cross-over point, or above the second cross-over point, that more primary electrons will impinge upon the surface of the thermoplastic tape 11 than secondaries are emitted, and its surface will assume a negative polarity charge. The value of this charge can be readily adjusted by adjusting the value of the voltage of the primary electron beam. If it is desired to charge the surface of the thermoplastic film recording medium positively, then the value of the primary electron velocity voltage is adjusted to lie between the two cross-over points so that more secondary electrons are emitted from the surface of the thermoplastic recording medium than there are primary electrons impinging upon its surface. When adjusted to operate within this region, the surface of the thermoplastic recording tape will assume a positive charge, the value of which can be adjusted by appropriately adjusting the value of the primary electron velocity voltage.

Subsequent to the precharging by the electron flood gun 16 the portion of the thermoplastic tape 11 thus precharged passes under the electron beam recording gun 17 where a finely focused beam of electrons is used to write the data desired to be recorded onto the surface of the solid thermoplastic tape in intelligence conveying patterns. If the equipment is to be used to record digital data, this pattern may constitute nothing more than a series of bits of information where the electron beam recorder is either on or off to establish an electrostatic charge at a particular point where it is desired that a bit occur. If it is assumed that the precharging electron flood gun 16 has charged the surface of the thermoplastic film tape 11 negatively to a value just below the threshold potential for deformation, then the electron beam recording gun 17 need only supply the additional charging required to alter the precharged level relative to the predetermined threshold potential sufficiently to raise the precharged level at that particular point to a value higher than the known threshold value. This results in a latent electrostatic charge pattern which has a charge value greater than that required for deformation, and is representative of the data to be stored.

In the event that the surface of the solid thermoplastic recording tape 11 has been charged positively by the precharging flood gun 16 in the previously described manner, then the writing beam of electrons provided by the electron beam recording device 17 need only be sufficiently strong to neutralize some of the positive charges on the surface of the tape 11 in those areas where it is desired that no deformations occur. The result is a latent electrostatic charge pattern which is representative of the data to be stored. Here again, it can be appreciated that the value of the positive precharge will be determined by the desired groove depth and angle as well as the beam current of the electron gun, and the recording rate, so that the desired recordings can be obtained by optimizing these variables. By either technique of applying a negative or a positive precharge, it can be appreciated that the surface of the solid thermoplastic tape 11 will have an electrostatic charge image formed on it which is representative of the information to be stored in terms of both the geometric pattern and the modulated groove depth or slope.

It should be mentioned at this point that it is also possible to post-charge the surface of the solid thermoplastic tape 11 either negatively or positively, and achieve substantially the same results. In the event post-charging were desired, the relative positions of the flood gun 16 and electron beam writing gun 17 would have to be reversed in the equipment shown in FIGURE 1. With the equipment thus modified, it is believed apparent that information to be recorded would first be written on tape 11, with the writing gun, then post-charging the surface of the tape with the flood gun results in a modulated electrostatic pattern. The optimum post-charge potential is determined by the same methods used to determine optimum precharge. Recording would then take place as discussed more fully above in connection with the precharging examples.

After recording a latent electrostatic charge image in any of the above-described manners, the portion of the tape thus treated, is then advanced to the heating station. At the heating station heating means 18 operates to heat the surface of the tape to a sufficiently fluid condition so that the electrostatic charge forces can selectively deform the surface of the tape in a manner previously described more fully in the above-identified Glenn Patent 3,113,179. Subsequent to the heating phase, the portion of the tape is advanced to the cooling station 19 where the surface of the thermoplastic tape 11 is allowed to cool sufficiently so that the deformations in its surface are permanently set. Thereafter, the permanent deformations may be optically checked by the optical inspection station comprised by the light source 22, a fluorescent member 23, and conventional microscope 24 which views the fluorescent pattern produced on the plate 23 by light refracted or diffracted by the deformations in the surface of the thermoplastic tape 11 from light source 22. It is not anticipated that the optical inspection station will be operated continuously but usually it is used only to ascertain that at the beginning of a recording run the values of the flood potential and the writing potential as well as the time-temperature characteristics of the heating phase are sufficient to form the requisite quality deformations in the surface of the thermoplastic tape. The deformations thus formed may then be read out by the readout station comprised by flying spot scanner 25 and its control circuitry 26 together with the optical assembly 27, 28, 29 and photo-detector 31. Since the operation of the readout station has been previously described in greater detail in the above-referenced Wolfe et al. Patent No. 3,121,216, a further description of the construction and operation of the readout station is believed unnecessary.

From the above description it can be appreciated that only enough electrons need to be deposited by the electron beam recording device 17 to provide differentially charged areas on the solid thermoplastic recording tape 11 in accordance with the information to be recorded. As a result, the number of electrons which the writing beam must deposit per unit time is greatly reduced thereby making it possible to write at much higher frequencies and to obtain better quality recordings with a given electron beam current capability.

Figure 3:
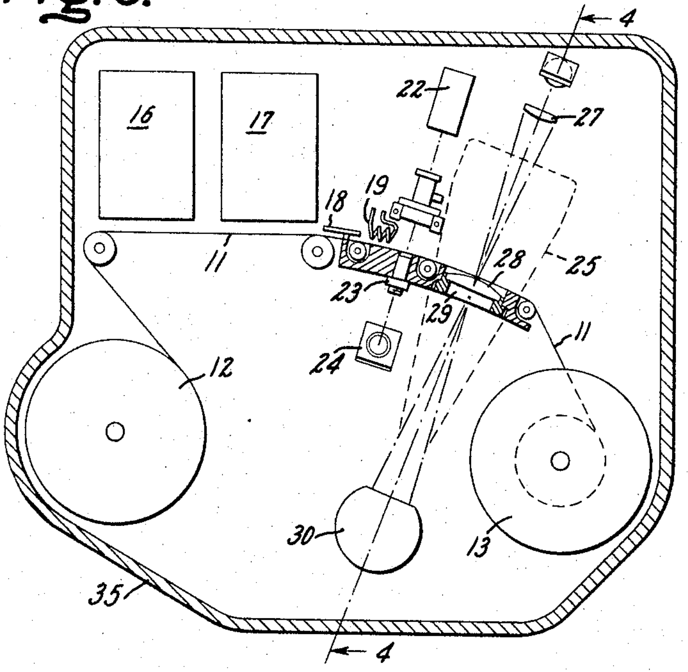
FIGURE 3 is a sectional view of a new and improved recording and readout apparatus constructed in accordance with the invention, which utilizes light optic readout techniques.
Figure 4:
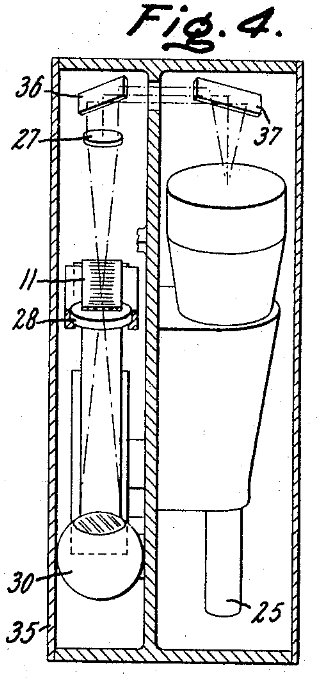
FIGURE 4 is a cross-sectional view of the apparatus shown in FIGURE 3.

FIGURES 3 and 4 of the drawings illustrate a practical construction for a working recording-readout apparatus constructed in accordance with the invention. In FIGURE 4 all of the elements of the recording apparatus have been given the same reference character as was used in connection with the schematic diagram of the apparatus shown in FIGURE 1. These elements are enclosed within an evacuated housing 35, and are arranged so that any given portion of the solid thermoplastic tape 11 is transported first under the electron flood gun 16, and then sequentially under the electron beam recording gun 17, the heating station 18, the cooling station 19, optical inspection station 22–24, the readout station comprised by 25–31, and finally to the take-up reel 13. For convenience, the equipment for evacuating housing 35 is not shown but would comprise a conventional, commercially available vacuum system. Also, as mentioned earlier, it is not essential that a recorder constructed in accordance with the invention also include a readout station in the apparatus. It might be desired to record only, and readout subsequently as, for example, might be done with an air borne recorder that is subsequently read out at a ground station. However, it is believed that in the majority of situations, it would be desirable to both record and read out with the same apparatus, and hence the arrangement shown in FIGURES 3 and 4 has been disclosed.

In order to accommodate a full-size flying spot scanner tube 25 within the housing 35, the portion of the housing in which the reading station is supported is divided into two parts as shown in FIGURE 4. With this arrangement, the scanning spot of light appearing on the face of the flying spot scanner tube 25 is projected by means of a pair of 45° tilted mirrors 36 and 37 from one side of the housing in which the tube 25 is mounted to the adjacent side through which tape 11 is transported. After being thus transmitted, the scanning beam of light passes through the optical assembly 27 down through the thermoplastic film tape 11 to be refracted to the electro-optical readout device 31, or to impinge upon a stop in an apertured plate as described earlier in connection with FIGURE 1. Since in all other respects the equipment shown in FIGURES 3 and 4 will operate in an identical manner to the over-all equipment discussed in connection with FIGURE 1 of the drawings, a further description of its operation is believed unnecessary.

Figure 5:
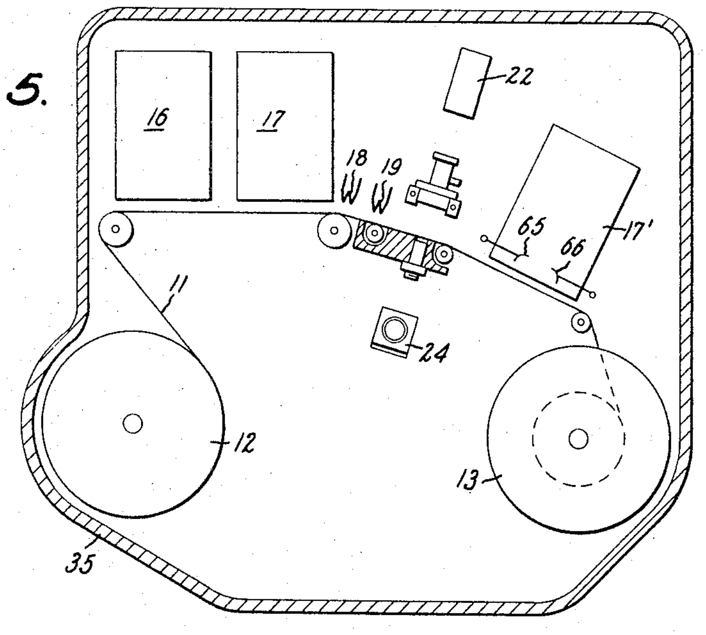
FIGURE 5 is a sectional view of a new and improved recording and readout apparatus utilizing electron beam readout techniques.
Figure 6:
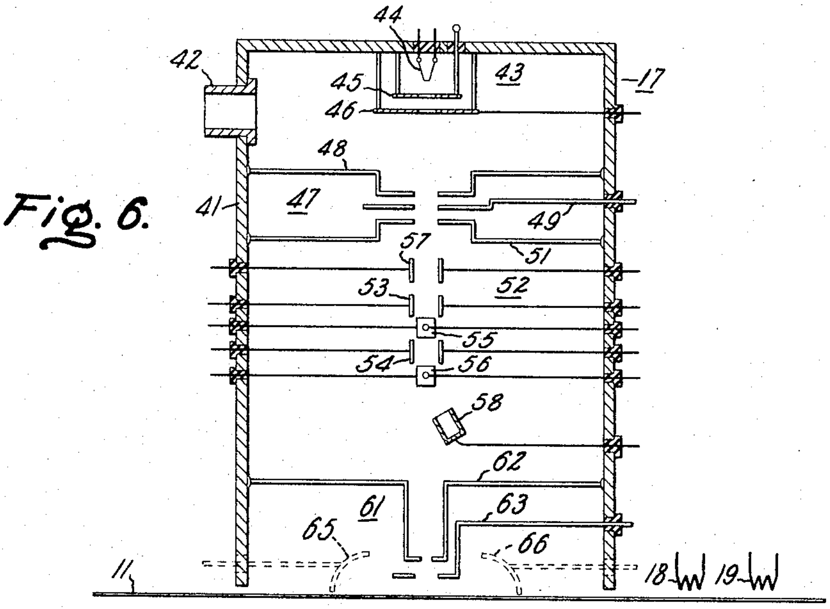
FIGURE 6 is a sectional view of an electron gun suitable for use in the apparatus of either FIGURE 3 or FIGURE 5, and which may be employed as a flood gun for charging purposes, as a recording gun for recording purposes, or as a readout gun for readout purposes.

FIGURE 6 of the drawings illustrates the details of construction of an electron beam recording device suitable for use in the data storage equipments of FIGURES 1 and 3, as well as in the equipment of FIGURE 5 to be described hereinafter. While the construction shown in FIGURE 6 is intended for use as the electron beam writer 17, it may be also used as the electron flood gun 16 by only minor modifications involving adjustments to the operating potentials applied to the device, perhaps increasing the size of the openings for the electron beam path provided in the deflection electrodes and the lens assemblies for the electron beam path to accommodate a larger beam diameter, etc. Basically, however, the structure and operation of the two devices would be similar, and hence it is deemed sufficient to illustrate the construction of the electron beam writer 17 alone.

The elecron beam writer 17 is comprised by a separate housing 41 having exhaust port 42 connected to a separate vacuum system in order that the interior of the housing 41 can be drawn down to a higher vacuum than the surrounding space within the outer housing 35 of the over-all data storage equipment. Supported within the housing 41 is an electron gun assembly shown generally at 43 for producing a beam of electrons. The electron gun assembly comprises an electron emitting cathode 44 positioned adjacent to a control electrode 45 and an accelerating electrode 46. The control and accelerating electrodes 45 and 46 have their central apertures aligned over the cathode 44 to form and accelerate the electrons emitted by the cathode into a suitable beam. The electron beam after passing out of the electron gun assembly 43 passes through a beam collimating arrangement 47 which is comprised by three electrostatic field producing, apertured plates 48, 49 and 51 positioned above the electron gun assembly 43. Each of the plates 48, 49 and 51 has a central aperture therein aligned along the electron beam path, and together serve to convert the electron beam which tends to diverge at this poinnt into a focused slightly converging beam of electrons. The two plates 48 and 51 are connected directly to the housing 41 which is maintained normally at or near ground potential, and the central plate 49 is connected through a suitable insulating connector to a source of high potential. The high potential on the plate 49 produces an electrostatic field which modifies the electron trajectories in a manner to produce the desired focusing action on the electrons. By virtue of this action, the collimating device 47 performs what is known as a condenser lens function.

The electron beam after being collimated by the condenser lens assembly 47 passes through a series of deflection electrodes 52 which serves to position the beam in space, and sweep it over the surface of the solid thermoplastic recording tape 11. The deflection electrodes 52 are comprised of horizontal deflection plate pairs 53 and 54, and corresponding vertical deflection plate pairs 55 and 56. The horizontal and vertical deflection voltages are simultaneously applied to the individual horizontal and vertical plate pairs in polarity opposition to produce double deflection of the electron beam thereby providing adequate deflection of the beam. By utilizing two pairs of deflection plates in each plane and applying the deflection voltages to each pair of plates in polarity opposition, the electron beam is bent in opposite directions by each pair of plates to produce a resultant beam trajectory which passes through the center of an objective lens assembly 61, to be described hereinafter. This occurs for all beam deflection positions and permits substantial angular deflection of the beam to provide for scanning over the surface of the thermoplastic film tape 11.

In addition to the deflection assembly 52, a beam holding means is provided which positions the electron beam away from the objective lens 61 and hence the thermoplastic recording tape 11 when it is desired not to be recording with the electron beam. For this purpose a pair of hold deflection plates 57 are provided together with a Faraday cage 58. Upon the application of a fixed holding deflection voltage to the hold deflection plates 57, the beam will be positioned away from the objective lens assembly 61, and therefore will be trapped by the Faraday cage 58 and held off of the thermoplastic film recording tape 11.

The objective lens assembly 61 comprises an electrostatic objective lens assembly which de-magnifies the electron beam, and focuses it on the surface of the thermoplastic film storage tape 11. The objective lens assembly 61 is comprised by a pair of apertured plates 62 and 63 positioned adjacent to the thermoplastic film tape 11. Plates 62 and 63 serve to produce an electrostatic field of such magnitude and configuration to de-magnify the beam by reducing the cross section in one dimension. Operating potential to produce the desired electrostatic field are provided through the plate 63, while the plate 62 is connected directly to the housing 41 held substantially at ground potential. The solid thermoplastic recording tape 11 is transported past the end of the objective lens assembly 61 so that its thermoplastic surface will be exposed to the writing beam of electrons. In the case of the electron flood gun, it may not be necessary to finely focus the beam of electrons so that the objective lens assembly 61 can be disposed of. Such modification is deemed obvious, however, and hence will not be described further.

If it is desired to utilize the electron beam writing gun 17 for readout purposes, as will be described more fully hereinafter in connection with FIGURE 5 of the drawings, it is necessary to modify the structure shown in FIGURE 6 to include a pair of collecting electrodes as indicated by the dotted lines at 65 and 66. Modification of the electron beam writing gun 17 in this manner, would allow the gun to be used for electron beam readout purposes in the manner described more fully in copending application Ser. No. 140,849, now Patent No. 3,247,493, entitled "Electron Beam Recording and Readout on Thermoplastic Film," John E. Wolfe and Robert G. Reeves, inventors, filed Sept. 26, 1961, and assigned to the General Electric Company. In the event that the electron beam writing gun 17 is used for readout purposes, the accelerating potentials applied to the gun are reduced somewhat from those used for writing purposes. With the operating potentials thus adjusted to accomplish electron beam readout, the primary electron beam in impinging upon the thermoplastic film tape 11 will produce secondary electrons that are collected by the collector electrodes 65 and 66. The secondary electrons collected by collector electrodes 65 and 66 can then be used to derive both a servoing signal to servo the primary readout electron beam provided by the electron gun 17, and to derive the intelligence modulated on the deformations in the surface of the thermoplastic film tape 11 as explained more fully in the above-referenced Wolfe and Reeves application.

FIGURE 5 of the drawings illustrates a practical design of an equipment which employs electron beam readout in place of the light optic readout utilized in the equipment illustrated in FIGURES 3 and 4. Insofar as the recording phase of the equipment is concerned, recording of deformations on the thermoplastic film tape 11 is identical to that described with relation to FIGURES 1, 3 and 4. It might be noted that in the equipment of FIGURE 5 a radiant heater 18 is used in place of the radio frequency heater described in connection with the arrangement of FIGURE 3. Since the results obtained are the same regardless of the manner of which heat is applied to the thermoplastic film surface, such an alternative structure is believed obvious. Subsequent to recording, if it is desired to read out, the electron beam readout device 17 can be adjusted to read out the data stored on the surface of the thermoplastic film tape 11 by the electron beam readout technique described briefly above, and explained more fully in the above-referenced Wolfe and Reeves application. During the readout operation, the flood gun 16 can be used to control the charge on the surface of the tape 11 so as to facilitate the read-out. This control over the charge on the surface of the tape 11 is necessitated by an undesirable tendency for charges to adversely affect the read-out of the tape 11 during electron beam read-out. These changes can come from various courses, such as tribo-electric effects during manufacture and use, from build-up of charge during electron beam readout, and from charge remaining after development of the writing.

In place of the three electron guns used in equipment illustrated in FIGURE 5 of the drawings, if it is desired to reduce the cost of the equipment, it would be possible to design a data storage equipment employing only two guns, or even only a single electron gun similar to that shown in FIGURE 6. In such modified equipment, a single gun could operate first as a flood gun to precharge the surface of the tape, secondly as a writing gun to record data to be stored on the surface of the tape, and, after the heating and cooling phase to set the deformations, the same gun could be used to read out the data thus stored. Such a two gun or single gun arrangement might require, however, that the thermoplastic film tape 11 be transported back and forth a number of times between its two supporting reels 12 and 13 for each of the precharging, writing, and reading operations, depending upon whether a two gun or single gun arrangement is used. If the user of the equipment is willing to accept this inconvenience in order to enjoy the advantages of a substantially cheaper data storage equipment, such modified arrangements are entirely practicable. If data rates are sufficiently slow, it would be possible to rapidly time share these functions while the tape 11 is moved at a uniform rate, thus not requiring tape 11 be passed back and forth a number of times. However, as between the two modified equipments, a two gun arrangement employing a flood gun and a writing gun having collector electrodes would be preferred for electron beam read out applications since the flood gun could then also be used to control build-up of charge on the surface of the thermoplastic tape 11 during read-out.

It should also be noted that it is entirely possible to practice the novel method of thermoplastic recording herein disclosed with conventional thermoplastic film recording devices such as are disclosed in the above-referenced Glenn and Wolfe et al. patents, if, prior to enclosing the thermoplastic film recording media within the vacuum-tight housings of these equipments, the thermoplastic media are provided with the required precharge measured with respect to the known threshold charge value. This could be done with a corona charging device, for example. The precharged thermoplastic would then be recorded upon with the conventional recording equipment as described above, and in the referenced Glenn and Wolfe et al. patents. The only difficulty with this approach would be encountered if one desired to erase any part of the recording. In those areas where the erasure took place the precharge would have been dissipated. It would then be necessary to re-insert a new precharged tape requiring either additional sources of tapes, and/or opening the housing (consequently breaking the vacuum within the housing) to insert a new precharged tape. With the preferred equipments described above no such undesirable features present themselves since it is entirely possible to erase at any particular point on the thermoplastic tape by the application of sufficient heat from the heating means. Subsequent to such erasure the erased part of the tape could be run back through the flood gun for precharge, written upon, heated, and subsequently read out or stored indefinitely, all without requiring that the housing be opened and the vacuum broken, or without requiring additional tapes. It might also be mentioned as a limit on the energy of the flooding electron beam that if lower accelerating potentials are employed with the flood gun, there will be less radiation damage to the thermoplastic recording medium during each recording cycle, and hence a larger number of erasures and reuses can be accommodated.

From the foregoing description, it can be appreciated that the present invention provides a new and improved recording technique using a solid thermoplastic recording medium which is precharged to a predetermined electric potential measured with respect to a known threshold potential below which no deformations occur. This is done preferably with a flooding electron beam. In one form of practicing the invention, the surface of the thermoplastic film recording medium is charged negatively so that the electron beam recording device used in writing the information to be stored need deposit only enough electrons in the areas where deformations are required to push the potential at these points beyond the known deformation threshold potential. In another form of practicing the invention the surface of the thermoplastic film recording medium is charged positively above the value of the threshold potential, and the electron beam recording device writing the information to be stored supplies only the electrons required to neutralize the charges at the points where deformations are not required to just push the potential at these points below the deformation threshold potential. By either technique the effect is identical in that the beam current required for a deformation exposure at any particular point is considerably reduced insofar as the requirements on the electron beam writing gun is concerned. It is also to be noted that considerable improvement in sensitivity can be obtained by charging the surface well above the threshold potential as discussed above. Accordingly, it can be appreciated therefore that the number of electrons to be deposited per unit of time in order to achieve selective deformation is considerably reduced and hence the electron beam recording device can be operated to higher frequencies with a given beam current.

Having described several embodiments of a new and improved enhanced sensitivity solid thermoplastic film recording method and apparatus constructed in accordance with the invention, it is believed obvious that other modifications and variations of the present invention are possible in light of the above teachings. It is therefore to be understood that changes may be made in the particular embodiment of the invention described which are within the full and intended scope of the invention as defined by the appended claims.

What we claim as new and desire to secure by Letters Patent of the United States is:

1. In a data storage system employing a solid thermoplastic recording medium, recording means for projecting a beam of charges onto the recording medium in intelligence conveying patterns to produce an electrostatic charge pattern on the surface of the medium that is representative of the data being stored, and heating means for heating the recording medium to a sufficiently fluid condition so that the electrostatic charge forces can deform the surface whereby upon subsequent cooling permanent deformations can be derived in the surface of the recording medium that are representative of the data being stored, the improvement comprising means for charging the surface of the recording medium to a predetermined voltage relative to a predetermined threshold voltage for deformation such that the recording beam need only supply the additional charging required to alter the surface voltage sufficiently so that upon heating selective deformation of the surface of the recording medium by the electrostatic charge forces in accordance with the data to be stored occurs.

2. In a data storage system employing a solid thermoplastic recording medium, recording means for projecting a beam of charges onto the recording medium in intelligence conveying patterns to produce an electrostatic charge pattern on the surface of the recording medium that is representative of the data to be stored, and heating means for heating the recording medium to a sufficiently fluid condition so that the electrostatic charge forces can deform the surface whereby upon subsequent cooling permanent deformations are derived in the surface of the recording medium which are representative of the data being stored, the improvement comprising charging means for providing a uniform positive post charge of predetermined level to the surface of the recording medium such that when algebraically added to the charges deposited by the recording means a differential modulated electrostatic pattern sufficient for deformation results in accordance with the information to be recorded and stored.

3. In a data storage system employing a solid thermoplastic recording medium, recording means for projecting a beam of charges onto the recording medium in intelligence conveying patterns to produce an electrostatic charge pattern on the surface of the recording medium that is representative of the data to be stored, and heating means for heating the recording medium to a sufficiently fluid condition so that the electrostatic charge forces can deform the surface whereby upon subsequent cooling permanent deformations are derived in the surface of the recording medium that are representative of the data being stored, the improvement comprising charging means for providing a uniform negative polarity post charge of predetermined level to the surface of the recording medium such that upon being algebraically added to the charges deposited by the recording means a differential modulated electrostatic pattern sufficient for deformation results in accordance with the information to be recorded and stored.

4. A data storage system including in combination a solid thermoplastic recording medium, precharging means positioned adjacent to the recording medium for precharging the surface of the recording medium to a predetermined charge value measured with respect to a known threshold charge value, electron beam recording means positioned adjacent to the recording medium for projecting a beam of electrons on the recording medium subsequent to the precharging whereby an electrostatic charge pattern having a charge greater than the known threshold value is formed on the surface of the recording medium which is representative of the data to be stored, heating means for heating the recording medium to a sufficiently fluid condition so that the electrostatic charge forces having a value greater than the threshold charge value deform the surface, and means for subsequently cooling the recording medium whereby permanent deformations are derived in the surface which are representative of the data being stored.

5. A data storage system including in combination a solid thermoplastic recording medium, precharging means positioned adjacent to the recording medium for providing a negative polarity precharge to the surface of the recording medium having a predetermined charge value relative to a known threshold value, electron beam recording means positioned adjacent to the recording medium for projecting a beam of electrons onto the recording medium subsequent to the precharging whereby the negative polarity electrostatic charge forces are modulated to a level greater than the threshold value in a pattern which is representative of the data to be stored, heating means for heating the recording medium to a sufficiently fluid condition so that the electrostatic charge forces having a value greater than the known threshold charge value deform the surface, and means for subsequently cooling the recording medium whereby permanent deformations are derived in the surface which are representative of the data being stored.

6. A data storage system including in combination a solid thermoplastic recording medium, radiant energy precharging means positioned adjacent to the recording medium for providing a positive polarity precharge to the surface of the recording medium which has a charge value above the known threshold value for deformation, electron beam recording means positioned adjacent to the recording medium for projecting a beam of electrons onto the recording medium subsequent to the precharge for partially neutralizing the positive polarity precharge to thereby form an electrostatic charge pattern on the surface of the recording medium representative of the data to be stored, heating means for heating the recording medium to a sufficiently fluid condition so that the modulated electrostatic charge forces deform the surface, and means for subsequently cooling the recording medium whereby permanent deformations are derived in the surface which are representative of the data being stored.

7. The method of storing data using a solid thermoplastic film recording medium comprising precharging the surface of the recording medium to a predetermined level above a known threshold value for deformation, recording by projecting a beam of charges onto the recording medium subsequent to the precharging to thereby form a modulated differential electrostatic charge pattern in excess of the known threshold deformation potential on the surface of the recording medium which is representative of the data to be stored, heating the recording medium to a sufficiently fluid condition so that the modulated differential electrostatic charge forces deform the surface thereof, and cooling the recording medium to thereby derive permanent deformations in the surface of the recording medium which are representative of the data to be stored.

8. The method of storing data using a solid thermoplastic recording medium comprising recording by projecting a beam of charges onto the recording medium to thereby form an electrostatic charge pattern on the surface of the recording medium which is representative of the data to be stored, charging the surface of the recording medium to a predetermined level above a known threshold value for deformation to thereby form a modulated differential electrostatic charge pattern having a charge greater than the known threshold value on the surface of the recording medium and which is representative of the data to be stored, heating the recording medium to a sufficiently fluid condition so that the modulated differential electrostatic charge forces deform the surfaces thereof, and cooling the recording medium to thereby derive permanent deformations in the surface of the recording medium which are representative of the data to be stored.

9. The method of storing data using a solid thermoplastic recording medium comprising precharging the surface of the recording medium to a predetermined negative polarity just below the value of a known threshold value for deformation, recording by projecting electrons onto the recording medium subsequent to the precharging to thereby raise the value of the electrostatic charge on the surface of the recording medium to a value higher than the known threshold value at points impinged upon by the electron beam, these points being in a pattern which is representative of the data to be stored, heating the recording medium to a sufficiently fluid condition so that the electrostatic charge forces greater than the known threshold value deform the surface thereof, and cooling the recording medium to thereby derive permanent deformations in the surface of the recording medium which are representative of the data to be stored.

10. The method of storing data on a solid thermoplastic recording medium comprising precharging the surface of the recording medium to a predetermined positive polarity to a known threshold value for deformation, recording by projecting a beam of electrons onto the recording medium subsequent to the precharging to thereby neutralize the charge on the surface of the recording medium in selected areas to a value just below the known threshold value in a pattern which is representative of the data to be stored, heating the recording medium to a sufficiently fluid condition so that the electrostatic charge forces remaining on the surface of the recording medium which have a value greater than the predetermined threshold value deform the surface thereof, and cooling the recording medium to thereby derive permanent deformations in the surface of the recording medium which are representative of the data to be stored.

11. A data storage and retrieval system including in combination a solid thermoplastic recording medium, an electron flood gun precharging means positioned adjacent to the recording medium for precharging the surface of the recording medium to a predetermined charge level in excess of a known threshold value for deformation, electron beam recording means positioned adjacent to the thermoplastic film recording medium for projecting a beam of electrons onto the recording medium subsequent to the precharge by the flood gun whereby a modulated differential electrostatic charge pattern is formed on the surface of the thermoplastic film recording medium which has a charge greater than the known threshold value and is representative of the data to be stored, heating means for heating the recording medium to a sufficiently fluid condition so that the electrostatic charge forces deform the surface in a manner which is representative of the data to be stored, means for subsequently cooling the recording medium whereby permanent deformations are derived in the surface which are representative of the data being stored, and readout means positioned adjacent to the thermoplastic film recording medium for reading out and retrieving the information thus recorded.

12. The combination set forth in claim 11 wherein an electron flood gun provides a precharge to the thermoplastic recording medium having a negative polarity and wherein the electron beam recording means raises the value of the charge on those areas where it impinges above the known threshold charge value so that the resulting electrostatic charge pattern has a charge equal to or greater than the threshold charge value and is representative of the data being stored.

13. The combination set forth in claim 11 wherein the electron flood gun provides a precharge to the surface of the thermoplastic recording medium which has a positive polarity greater than the known threshold value for deformation, and wherein the electron beam recording means neutralizes the value of the positive polarity charge in those areas on which it impinges whereby an electrostatic charge pattern having areas selectively charged and representative of the information to be stored is formed on the surface of the recording medium.

14. The combination set forth in claim 11 wherein the accelerating potentials applied to the electron flood gun are adjusted to minimize radiation damage to the solid thermoplastic recording medium to thereby maximize its number of reuses.

References Cited

UNITED STATES PATENTS

| | | | |
|---|---|---|---|
| 2,391,451 | 12/1945 | Fischer | 96—1.1 |
| 3,113,179 | 12/1963 | Glenn | 340—173 |
| 3,131,019 | 9/1964 | D'Antonio | 340—173 |
| 3,162,104 | 12/1964 | Medley. | |
| 3,315,137 | 4/1967 | Richardson | 346—74 |

BERNARD KONICK, *Primary Examiner.*

J. BREIMAYER, *Assistant Examiner.*